United States Patent [19]
Thyret et al.

[11] 4,345,056
[45] Aug. 17, 1982

[54] PROCESS FOR SUSPENSION POLYMERIZATION OF VINYL CHLORIDE EMPLOYING MIXED PROTECTIVE COLLOIDS

[75] Inventors: Helmut E. Thyret; Thomas Balwé; Gerhard Beier; Johann Bauer, all of Burghausen, Fed. Rep. of Germany

[73] Assignee: Wacker-Chemie GmbH, Munich, Fed. Rep. of Germany

[21] Appl. No.: 959,796

[22] Filed: Nov. 13, 1978

Related U.S. Application Data

[63] Continuation of Ser. No. 803,655, Jun. 6, 1976, abandoned.

[30] Foreign Application Priority Data

Jul. 2, 1976 [DE] Fed. Rep. of Germany ....... 2629880

[51] Int. Cl.³ .............................................. C08F 2/20
[52] U.S. Cl. ..................................... 526/200; 526/201; 526/202
[58] Field of Search ............ 526/200, 201, 202, 344.2, 526/345

[56] References Cited

U.S. PATENT DOCUMENTS 3,172,877  3/1965  Fishbein ....................... 526/344.2 X
3,592,800  7/1971  Oschmann ..................... 526/202 X
3,817,959  6/1974  Balwé ................................. 526/200
3,817,963  6/1974  Balwé ................................. 526/200
3,929,753  12/1975  Itoh ............................. 526/344.2 X

FOREIGN PATENT DOCUMENTS 2555568  6/1976  Fed. Rep. of Germany ........ 526/74
991134   5/1965  United Kingdom ................ 526/200
1237735  6/1971  United Kingdom ................ 526/202

Primary Examiner—C. A. Henderson
Attorney, Agent, or Firm—Hammond & Littell, Weissenberger and Muserlian

[57] ABSTRACT

An improvement in the process of producing polyvinyl chloride by the suspension process in the presence of protective colloids by utilizing a protective colloid mixture of from 20% to 80% of the protective colloid mixture of a polyvinyl acetate having a hydrolysis degree of 40 to 55 mol % and the remainder of the protective colloid mixture of (1) a water-soluble polyvinyl alcohol having a hydrolysis degree of 70 to 90 mol %, or (2) an aminoethyl-hydroxypropyl cellulose having a molar substitution of from 0.05 to 1.5 mols of aminoethyl groups and 3 to 5 mols of hydroxypropyl groups, or (3) a vinyl acetate/vinyl pyrrolidone copolymer having a ratio of vinyl pyrrolidone to vinyl acetate in the copolymer of 50% to 70% by weight to 30% to 50% by weight and a K-value of 25 to 40. By the use of this protective colloid mixture, the polyvinyl chloride produced exhibits a large absorption of plasticizer and gives finished products having a low number of specks.

2 Claims, No Drawings

PROCESS FOR SUSPENSION POLYMERIZATION OF VINYL CHLORIDE EMPLOYING MIXED PROTECTIVE COLLOIDS

This is a continuation of Ser. No. 803,655, filed June 6, 1976, now abandoned.

In the manufacture of polyvinyl chloride according to the suspension process, it is desired to achieve certain properties in the polyvinyl chloride particles depending on the intended use of the polymer. If the desired products are free-flowing, pulverulent mixtures of polymer and plasticizers, then a requirement of the polymer is, inter alia, a rapid and high degree of absorption of plasticizer in the case of both hot mixing and cold mixing.

RELATED ART

Processes for the manufacture of polyvinyl chloride characterized by a rapid and high degree of absorption of plasticizer are known, as also are those in which merely by selecting suitable suspending agents certain results can be achieved without additional chemical or technical measures. Thus, in British Patent Specification No. 1,378,875 it is recommended that preferably hydroxyethylcellulose be used in combination with a cationic, surface-active compound, and in U.S. Pat. No. 2,528,469, it is recommended that methylcellulose be used in combination with an anionic emulsifier as dispersant. The use of ionic emulsifiers is not suitable, however, for applications of the resulting polymer in areas requiring high electrical resistance and a low degree of water absorption.

Also, the combination of two protective colloids, as described (1) in Japanese Patent Specification No. 73-29629, where a combination of methylcellulose and hydroxypropylmethylcellulose are employed, or (2) in German Offenlegungsschrift (DOS) No. 22 09 592, where a combination of two cellulose ethers, one having a viscosity of <100 mPas and the other of >400 mPas are employed, or (3) in German Auslegeschrift No. (DAS) 17 20 328, where a combination of a cellulose ether, a 4% solution in water of which has a viscosity of <20 mPas with a polyvinyl alcohol having 2% to 25% by weight residual acetate groups and a 4% aqueous solution of which has a viscosity of 1 to 8 mPas are employed, although leading to free-flowing, plasticizer-containing intermediates, give finished products that are industrially unsatisfactory and have too high a number of specks or fish eyes.

OBJECTS OF THE INVENTION

The object of the invention is thus to provide a process for the manufacture of polyvinyl chloride according to the suspension process, which after the cold and hot mixing process exhibits a capacity for a large absorption of plasticizer and gives finished products having a low number of specks.

Another object of the present invention is the development of the process for the production of polyvinyl chloride comprising the steps of heating an aqueous suspension of monomers selected from the group consisting of vinyl chloride and mixtures of vinyl chloride with up to 20% by weight of monomers copolymerizable with vinyl chloride under suspension polymerization conditions in the presence of from 0.01% to 0.3% by weight, based on the weight of monomers, of at least one monomer-soluble free-radical polymerization catalyst, and from 0.05% to 0.5% by weight, based on the weight of the monomers, of at least two protective colloids, at a pH of from 3 to 8 and the autogeneous vinyl chloride pressure, to a temperature of from 30° C. to 70° C. for a time sufficient to effect polymerization and recovering said polyvinyl chloride having a K-value of from 40 to 80, the improvement consisting of utilizing a mixture of a first component of from 20% to 80% of the weight of said mixture of a polyvinyl acetate having a hydrolysis degree of 40 to 55 mol % and a viscosity, measured in a 4% solution of a 1:1 mixture of isopropanol and water at 20° C. by the Höppler falling-ball viscosimeter, of from 5 to 15 mPas, and the remainder of said mixture being a second component of protective colloid selected from the group consisting of (1) a water-soluble polyvinyl alcohol having a hydrolysis degree of 70 to 90 mol % and a viscosity, measured in a 4% aqueous solution at 20° C., of from 5 to 40 mPas, (2) an aminoethyl-hydroxypropyl-cellulose having a molar substitution of from 0.05 to 1.5 mols of aminoethyl groups and from 3 to 4 mols of hydroxypropyl groups and a viscosity, measured in a 2% aqueous solution at 20° C. and a pH of 5, of from 50 to 500 mPas, and (3) a vinyl acetate/vinyl pyrrolidone copolymer containing from 50% to 70% by weight of vinyl pyrrolidone and 30% to 50% by weight of vinyl acetate and having a K-value of from 25 to 40, as said at least two protective colloids, whereby said polyvinyl chloride has a low tendency to form specks and a high plasticizer absorption capacity.

These and other objects of the present invention will become more apparent as the description thereof proceeds.

DESCRIPTION OF THE INVENTION

The subject matter of the invention is a process for the manufacture of polyvinyl chloride and vinyl chloride copolymers having up to 20% by weight of monomers copolymerizable with vinyl chloride, having a low number of specks and a high plasticizer absorption capacity, according to the suspension process, in the presence of 0.01% to 0.3% by weight of monomer-soluble free-radical initiators, based on the total monomers, at pH values of between 3 and 8, under autogenous vinyl chloride pressure and, optionally, in the presence of pH buffer systems, at temperatures of between 30° C. and 70° C., preferably 40° C. to 65° C., in the pressure of a total of 0.05% to 0.5% by weight of a combination of at least two protective colloids, calculated on total monomers, in customary polymerization autoclaves, to give polymers having K-values of between 40 and 80, characterized in that 20% to 80%, preferably 20% to 65%, by weight of the total amount of protective colloid is a polyvinyl acetate having a degree of hydrolysis of 40 to 55 mol % and a 4% solution (1:1 mixture of isopropanol with water at 20° C., Höppler falling-ball viscosimeter) of which has a viscosity of 5 to 15 mPas and the second protective colloid is either (1) a water-soluble polyvinyl alcohol having a degree of hydrolysis of 70 to 90 mol %, preferably 70 to 80 mol %, and a 4% aqueous solution of which has a viscosity of 5 to 40 mPas, preferably 5 to 15 mPas, or (2) is an aminoethyl-hydroxypropyl-cellulose having a molar substitution of 0.05 to 1.5 mols of aminoethyl groups and 3 to 5 mols of hydroxypropyl groups, a 2% solution in water at a pH of 5° and 20° C. of which has a viscosity of 50 to 500 mPas (Höppler falling-ball viscosimeter) or (3) a vinyl acetate/vinyl pyrrolidone copolymer having a ratio of vinyl pyrrolidone to vinyl acetate in the copolymer of 50% to 70% by weight to 30% to 50% by weight and a K-value of 25 to 40.

More particularly, the present invention relates to the process for the production of polyvinyl chloride comprising the steps of heating an aqueous suspension of monomers selected from the group consisting of vinyl chloride and mixtures of vinyl chloride with up to 20% by weight of monomers copolymerizable with vinyl chloride under suspension polymerization conditions in the presence of from 0.01% to 0.3% by weight, based on the weight of monomers, of at least one monomer-soluble free-radical polymerization catalyst, and from 0.05% to 0.5% by weight, based on the weight of the monomers, of at least two protective colloids, at a pH of from 3 to 8 and the autogenous vinyl chloride pressure, to a temperature of from 30° C. to 70° C. for a time sufficient to effect polymerization and recovering said polyvinyl chloride having a K-value of from 40 to 80, the improvement consisting of utilizing a mixture of a first component of from 20% to 80% of the weight of said mixture of a polyvinyl acetate having a hydrolysis degree of 40 to 55 mol % and a viscosity, measured in a 4% solution of 1:1 mixture of isopropanol and water at 20° C. by the Höppler falling-ball viscosimeter, of from 5 to 15 mPas, and the remainder of said mixture being a second component of protective colloid selected from the group consisting of (1) a water-soluble polyvinyl alcohol having a hydrolysis degree of 70 to 90 mol % and a viscosity, measured in a 4% aqueous solution at 20° C., of from 5 to 40 mPas, (2) an aminoethyl-hydroxypropyl-cellulose having a molar substitution of from 0.5 to 1.5 mols of aminoethyl groups and from 3 to 4 mols of hydroxypropyl groups and a viscosity, measured in a 2% aqueous solution at 20° C. and a pH of 5, of from 50 to 500 mPas, and (3) a vinyl acetate/vinyl pyrrolidone copolymer containing from 50% to 70% by weight of vinyl pyrrolidone and 30% to 50% by weight of vinyl acetate and having a K-value of from 25 to 40, as said at least two protective colloids, whereby said polyvinyl chloride has a low tendency to form specks and a high plasticizer absorption capacity.

Furthermore, it may be advantageous to carry out the polymerization in the presence of 0.01% to 5% by weight of one or more nonionic emulsifiers or surface-active compounds having an HLB value of between 5 and 20.

The polyvinyl chloride or vinyl chloride copolymer having up to 20% by weight of monomers copolymerizable with vinyl chloride, produced according to the process of the invention, surprisingly shows not only an improved plasticizer absorption capacity, but also a lower number of specks in comparison with the products of conventional processes. Furthermore, the polymers of the invention are distinguished by a greater speed of plasticizer absorption.

In addition to vinyl chloride, the monomers copolymerizable with vinyl chloride may be, for example, monoethylenically-unsaturated monomers, such as styrene, substituted styrenes, acrylic monomers and substituted acrylic monomers, for example, acrylonitrile, (meth)acrylic acid, (meth)acrylic acid esters with alkanols having 1 to 18 carbon atoms, such as methyl(meth)acrylate, ethyl(meth)acrylate, propyl (meth)acrylate, butyl (meth)acrylate, 2-hydroxy-ethyl (meth)acrylate, phenyl (meth)acrylate, glycidyl acrylate; vinyl esters with alkanoic acids having 1 to 18 carbon atoms, such as vinyl formiate, vinyl acetate, vinyl propionate, vinyl butyrate; vinyl halides having 1 to 3 halogen atoms, such as vinyl fluoride, vinylidene fluoride, vinylidene chloride, vinyl bromide, vinylidene bromide; vinyl ethers, for example, vinyl alkyl ethers having 1 to 18 carbon atoms in the alkyl, such as vinyl propyl ether, vinyl butyl ether, vinyl 2-ethylhexyl ether; vinyl ketones, for example, vinyl alkyl ketones having 1 to 18 carbon atoms in the alkyl, such as vinyl methyl ketone, vinyl ethyl ketone; vinyl phenyl ketone; unsaturated carboxylic acids, for example, lower alkendioic acids, such as maleic acid, fumaric acid, itaconic acid, and the full or half esters thereof with alkanols having 1 to 18 carbon atoms; unsaturated alcohols, for example, alkenols having 3 to 8 carbon atoms, such as, for example, allyl alcohol.

The first component of the protective colloid mixture, polyvinyl acetate, used in quantities of 20% to 80%, preferably 20% to 65%, by weight of the total quantity of protective colloid, has a degree of hydrolysis of 40 to 55 mol %, corresponding to a saponification number of 400 to 480 mg of potassium hydroxide per gram, and a viscosity in a 4% solution in a 1:1 isopropanol/water mixture at 20° C. of 5 to 15 mPas, measured with the Höppler falling-ball viscosimeter. This polyvinyl acetate is substantially insoluble in water. It can be added to the polymerization mixture in a solid, finely divided form or it can be dissolved in organic solvents or a mixture of water and organic solvents miscible therewith that do not disturb the polymerization, and added in this form.

Examples of such organic solvents are short-chain alcohols, such as methanol, ethanol; short-chain alkanones, such as acetone, methyl ethyl ketone, or also ethyl acetate, tetrahydrofuran, etc.

A suitable second component of the protective colloid combination is, for example, a water-soluble polyvinyl alcohol having 10 to 30 mol % of residual acetate groups (hydrolysis degree of 70 to 90 mol %), preferably polyvinyl alcohol having 20 to 30 mol % of residual acetate groups. The viscosity of a 4% aqueous solution at 20° C. should be 5 to 40 mPas, preferably 5 to 15 mPas, measured with the Höppler falling-ball viscosimeter. It is also possible to use an aminoethyl-hydroxypropyl-cellulose as the second protective colloid component. This aminoethyl-hydroxypropyl-cellulose has a molar substitution (MS) of aminoethyl groups of 0.05 to 1.5 mols and 3 to 5 mols of hydroxypropyl groups per anhydroglucose unit. The viscosity of a 2% aqueous solution at a pH of 5 at 20° C. should be 50 to 500 mPas (measured with the Höppler falling-ball viscosimeter). Other suitable alternatives for the second component of the protective colloid combination are copolymers of vinyl pyrrolidone and vinyl acetate. The ratio of vinyl pyrrolidone to vinyl acetate is 50% to 70% by weight to 30% to 50% by weight. The K-value is between 25 and 40. The protective colloid mixtures may be added to the polymerization mixture either in the form of solids or in the form of their aqueous solutions. Quantities of 0.05% to 0.5% by weight, based on the weight of the monomers, are used.

In many cases it may also be advantageous, additionally, to add nonionic emulsifiers or surface-active compounds to the polymerization mixture. Those suitable as emulsifiers are those having an HLB value (hydrophile lyophile balance) of between 5 and 20, in particular, for example, polyoxyethylenesorbitan fatty acid esters. The nonionic emulsifiers are employed in amounts of from 0 to 0.3%, preferably 0.01% to 0.3% by weight, based on the weight of the monomers.

The suitable monomer-soluble free-radical initiators or catalysts are all those polymerization catalysts customarily used for suspension polymerization selected from the groups consisting of diacyl peroxides, dialkyl peroxides and aroyl peroxides, such as, for example, diacetyl peroxide, dibenzoyl peroxide, dilauroyl peroxide and 2,4-dichlorobenzoyl peroxide; dialkyl and dicycloalkyl peroxydicarbonates, such as diisopropyl peroxydicarbonate, dicyclohexyl peroxydicarbonate, di-(tert.-butylcyclohexyl)peroxydicarbonate, di-(ethylcyclohexyl)peroxydicarbonate, dimyristyl peroxydicarbonate, dicetyl peroxydicarbonate and distearyl peroxydicarbonate; peresters, such as isopropyl peracetate and tert.-butyl peracetate, tert.-butyl peroctoate, tert.-butyl perpivalate, tert.-butyl perneodecanoate and isoamyl perneodecanoate; mixed anhydrides of organic persulfuric acids and organic carboxylic acids, such as, for example, acetylcyclohexylsulfonyl peroxide; organic azo compounds, such as, for example, azoisobutyronitrile and azobis-(dimethylvalerodinitrile). The initiators are used in amounts of from 0.01% to 0.3% by weight, based on the total monomers either individually or in combination with each other.

The polymerization is carried out under the conditions customary for PVC polymerization. In general, operation is carried out at temperatures between 30° C. and 70° C., preferably 40° C. and 65° C., under autogenous vinyl chloride pressure and at pH values of between 3 and 8. The pH value of the reaction medium can be held constant by the addition of customary buffer systems, such as, for example, bicarbonate, hydrogenphosphate, or borate. It may often be an advantage also to add substances preventing depositions on the wall (of the reaction vessel) such as inorganic reducing agents, for example, sodium nitrite, or organic dyestuffs, or the leuco bases thereof, and to use polymerization chain length regulators, such as, for example, cis or transtrichloroethylene or mixtures thereof, or also aldehydes, such as acetaldehyde, propionaldehyde, etc. The customary polymerization autoclaves with stirrer, flow disturbers and, if appropriate, reflux condenser, serve as reaction vessels. The amount of monomers in the polymerization mixture can be 10% to 50% by weight. During the polymerization, both water and monomer can be metered-in gradually.

The following examples serve for the further explanation of the process of the invention, without being limitative in any respect.

EXAMPLE 1 (Comparison)

A polymerization mixture of the following composition was introduced into a polymerization autoclave:

```
910   kg of deionized water,
0.088 kg of a methylcellulose which has a methyl
      molar substitution degree of 2.1 and a vis-
      cosity, in a 2% aqueous solution at 20° C., of
      18 mPas measured according to Höppler,
0.792 kg of a polyvinyl alcohol which has a hydrol-
      ysis degree of 72% and a viscosity in a 4%
      aqueous solution at 20° C., of 5 mPas measured
      according to Höppler,
0.285 kg of dicetyl peroxydicarbonate,
25    ccm of sulfuric acid, 10% strength.
```

After evacuation, 570 kg of vinyl chloride were introduced. Subsequently, polymerization was carried out for a period of 8 hours at 56° C. The properties of the product are given in Tables I and II.

EXAMPLE 2

The process was carried out as in Example 1, but with the following composition of the polymerization mixture:

```
910   kg of deionized water,
570   kg of vinyl chloride,
0.703 kg of a polyvinyl alcohol which has a hy-
      drolysis degree of 72% and a viscosity,
      in a 4% aqueous solution at 20° C., of 5
      mPas measured according to Höppler,
0.176 kg of a polyvinyl acetate which has a hy-
      drolysis degree of 48% and a viscosity,
      in a 4% solution in a 1:1 mixture of
      isopropanol/water at 20° C., of 9 mPas,
      measured according to Höppler, dissolved
      in 534 gm of methanol,
0.285 kg of dicetyl peroxydicarbonate,
25    ccm of sulfuric acid, 10% strength.
```

The properties of the product are given in Tables I and II.

EXAMPLE 3

The process was carried out as in Examples 1 and 2, but with the following composition of the polymerization mixture:

```
910   kg of deionized water,
570   kg of vinyl chloride,
0.740 kg of a polyvinyl alcohol which has a hy-
      drolysis degree of 72% and a viscosity,
      in a 4% aqueous solution at 20° C., of 5
      mPas, measured according to Höppler,
0.396 kg of a polyvinyl acetate which has a hy-
      drolysis degree of 48% and a viscosity,
      in a 4% solution in a 1:1 mixture of
      isopropanol/water at 20° C., of 9 mPas,
      measured according to Höppler, dissolved
      in 1.214 kg of methanol,
0.285 kg of dicetyl peroxydicarbonate,
25    ccm of sulfuric acid, 10% strength.
```

The properties of the resulting polyvinyl chloride are listed in Tables I and II.

EXAMPLE 4

The process was carried out as in the previous examples, but with the following composition of the polymerization mixture:

```
915   kg of deionized water,
570   kg of vinyl chloride,
0.439 kg of a polyvinyl alcohol which has a hy-
      drolysis degree of 72% and a viscosity,
      in a 4% aqueous solution at 20° C., of 5
      mPas measured according to Höppler,
0.439 kg of a polyvinyl acetate which has a hy-
      drolysis degree of 48% and a viscosity,
      in a 4% solution in a 1:1 mixture of
      isopropanol/water at 20° C., of 9 mPas,
      measured according to Höppler, dissolved
      in 1330 gm of methanol,
0.285 kg of dicetyl peroxydicarbonate,
25    ccm of sulfuric acid, 10% strength.
```

The properties of the resulting product are given in Tables I and II.

EXAMPLE 5

The method was the same as in the previous examples, but with the following polymerization mixture:

990 kg of deionized water,
500 kg of vinyl chloride,
0.500 kg of a polyvinyl alcohol which has a hydrolysis degree of 88% and a viscosity, in a 4% aqueous solution at 20° C., of 40 mPas, measured according to Höppler,
0.492 kg of a polyvinyl acetate which has a hydrolysis degree of 48% and a viscosity, in a 4% solution in a 1:1 mixture of isopropanol/water at 20° C., of 9 mPas, measured according to Höppler, dissolved in 1508 gm of methanol,
0.250 kg of dicetyl peroxydicarbonate,
25 ccm of sulfuric acid, 10% strength.

The properties of the product are listed in Tables I and II.

EXAMPLE 6

The polymerization mixture was as follows; otherwise, the process was carried out as in the other examples:

910 kg of deionized water,
570 kg of vinyl chloride,
0.684 kg of a polyvinyl alcohol which has a hydrolysis degree of 72% and a viscosity, in a 4% aqueous solution at 20° C., of 5 mPas, measured according to Höppler.
0.228 kg of a polyvinyl acetate which has a hydrolysis degree of 48% and a viscosity, in a 4% solution in a 1:1 mixture of isopropanol/water, at 20° C., of 9 mPas, measured according to Höppler, dissolved in 672 gm of methanol,
0.285 kg of a polyoxyethylenesorbitan monostearate,
0.285 kg of dicetyl peroxydicarbonate,
25 ccm of sulfuric acid, 10% strength.

The properties of the resulting product are given in Tables I and II.

EXAMPLE 7

The process was carried out as in the previous examples, but with the following polymerization mixture:

975 kg of deionized water,
500 kg of vinyl chloride,
0.500 kg of an aminoethyl-hydroxypropyl-cellulose having a molar substitution of aminoethyl groups of 0.2 and a molar substitution of hydroxypropyl groups of more than 3 and a viscosity, in a 2% aqueous solution at a pH of 5, at 20° C., of 170 mPas, measured according to Höppler,
0.500 kg of a polyvinyl acetate which has a hydrolysis degree of 48% and a viscosity, in a 4% solution in a 1:1 mixture of isopropanol/water at 20° C., of 9 mPas, measured according to Höppler, dissolved in 740 gm of methanol,
0.250 kg of dicetyl peroxydicarbonate,
25 ccm of sulfuric acid, 10% strength.

The properties of the resulting product are reproduced in Tables I and II.

EXAMPLE 8

The method was the same as in the preceding examples, but the polymerization mixture was altered as follows:

910 kg of deionized water,
570 kg of vinyl chloride,
0.940 kg of a copolymer of 60% vinyl pyrrolidone and 40% vinyl acetate having a K value of 32,
0.313 g of a polyvinyl acetate which has a hydrolysis degree of 48% and a viscosity, in a 4% solution in a 1:1 mixture of isopropanol/water at 20° C., of 9 mPas, measured according to Höppler, dissolved in 947 gm of methanol,
0.285 kg of dicetyl peroxydicarbonate,
50 ccm of sulfuric acid, 10% strength.

The properties of the resulting polyvinyl chloride are given in Tables I and II.

EXAMPLE 9

The process was carried out as in Example 8 but with the following polymerization mixture:

930 kg of deionized water,
570 kg of vinyl chloride,
0.297 kg of a polyvinyl alcohol which has a hydrolysis degree of 72% and a viscosity, in a 4% aqueous solution at 20° C., of 5 mPas, measured according to Höppler,
0.445 kg of a polyvinyl acetate which has a hydrolysis degree of 48% and a viscosity, in a 4% solution in a 1:1 mixture of isopropanol/water at 20° C., of 9 mPas, measured according to Höppler, dissolved in 1.5 kg of methanol,
0.285 kg of dicetyl peroxydicarbonate,
25 ccm of sulfuric acid, 10% strength.

The properties of the product are reproduced in Tables I and II.

The bulk density of the products were determined in each case according to DIN 53 194, and the vibration weight or compact bulk density according to DIN 53 468.

The porosity was ascertained in accordance with the mercury penetration method with an Aminco porosimeter of American Instruments Co. It was measured at a pressure of 350 atmospheres excess pressure.

To determine the amount of plasticizer absorbed, the following process was carried out:

5 gm of the polyvinyl chloride to be examined were contacted in a porcelain dish with dioctyl phthalate from a burette, whilst stirring with a spatula, until the mixture left traces of plasticizer behind when pressed lightly between filter papers. All the values specified are mean values from 5 measurements. The speed at which plasticizer was absorbed was measured according to the following method. The test was carried out in a Brabender plastograph having a planetary mixer thermostatically heated to 80° C. In the planetary mixer, 500 gm of polyvinyl chloride were preheated and contacted with 250 gm of preheated DOP, which, in the case of the plastograph, resulted in a great increase in the moment of rotation. The moment of rotation has a constant value from the time of complete plasticizer absorption, the "drying point", onwards. The time between addition of plasticizer and the drying point is specified as the drying time in minutes. To determine the number of specks, a rolled sheet was prepared according to the Leuchs test from a mixture of polyvinyl chloride/plasticizer/carbon black, which sheet is removed from the roller after certain times. The tiimes are 6, 7, 8, 9 and 10 minutes. The flecks in a defined area are counted and given per 100 cm².

The time required for 135 gm of polyvinyl chloride to flow out of a funnel having a diameter of its opening of 8 mm, is a measure of the trickling or free flow.

TABLE I

Comparison of the Products from the Individual Examples

| Example | d' mm | n | bulk density g/cm$^{-3}$ | vibration weight g/cm$^{-3}$ | porosity cm$^3$/g$^{-1}$ | DOP-absorption % by weight | drying time/ min | trickling ability seconds |
|---|---|---|---|---|---|---|---|---|
| 1 (Comparison) | 0.145 | 5.0 | 0.465 | 0.526 | 0.253 | 34 | 11.75 | 41.7 |
| 2 | 0.14 | 6.0 | 0.466 | 0.526 | 0.303 | 40 | 10.0 | 39.7 |
| 3 | 0.14 | 4.9 | 0.454 | 0.515 | 0.371 | 45 | 8.75 | 33.2 |
| 4 | 0.145 | 4.3 | 0.468 | 0.538 | 0.350 | 40 | 9.0 | 38.3 |
| 5 | 0.16 | 5.5 | 0.476 | 0.550 | 0.282 | 38 | 9.5 | 32.2 |
| 6 | 0.135 | 4.3 | 0.418 | 0.476 | 0.395 | 45 | 9.0 | 38.4 |
| 7 | 0.138 | 5.5 | 0.509 | 0.581 | 0.296 | 36 | 11.5 | 35.4 |
| 8 | 0.145 | 4.5 | 0.454 | 0.515 | 0.427 | 45 | 10.75 | 36.7 |
| 9 | 0.15 | 4.8 | 0.468 | 0.515 | 0.322 | 45 | 9.5 | 35.7 | d' = mean granule size,
n = uniformity coefficient according to Rosin-Rammler

TABLE II

| | Number of Specks After Minutes | | | | |
|---|---|---|---|---|---|
| Example | 6 | 7 | 8 | 9 | 10 (two values) |
| (Comparison) | | | | | |
| 1 | 14 | 13 | 12 | 5 | 3/4 |
| 2 | 4 | 2 | 1 | 0 | 0/0 |
| 3 | 0 | 0 | 0 | 0 | 0/0 |
| 4 | 2 | 0 | 0 | 0 | 0/0 |
| 5 | 2 | 0 | 0 | 0 | 0/0 |
| 6 | 1 | 1 | 0 | 0 | 0/0 |
| 7 | 1 | 0 | 1 | 0 | 0/0 |
| 8 | 1 | 0 | 0 | 0 | 0/1 |
| 9 | 1 | 1 | 0 | 0 | 0/0 |

These results of Tables I and II show that the products of the present invention, Examples 2 to 9, consistently have better plasticizer absorption and a faster plasticizer absorption rate (lower drying time). In addition, the porosities were greater and the trickling ability was better. Speck formation was very much less.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the production of polyvinyl chloride comprising the steps of heating an aqueous suspension of monomers selected from the group consisting of vinyl chloride and mixtures of vinyl chloride with up to 20% by weight of monomers copolymerizable with vinyl chloride under suspension polymerization conditions in the presence of from 0.01% to 0.3% by weight, based on the weight of monomers, of at least one monomer-soluble free-radical polymerization catalyst, and from 0.05% to 0.5% by weight, based on the weight of the monomers, of at least two protective colloids, at a pH of from 3 to 8 and the autogenous vinyl chloride pressure, to a temperature of from 30° C. to 70° C. for a time sufficient to effect polymerization and recovering said polyvinyl chloride having a K-value of from 40 to 80, the improvement consisting of utilizing a mixture of a first component of from 20% to 80% of the weight of said mixture of a polyvinyl acetate having a hydrolysis degree of 40 to 50 mol % and a viscosity, measured in a 4% solution of a 1:1 mixture of isopropanol and water at 20° C. by the Höppler falling-ball viscosimeter, of from 5 to 15 mPas, and the remainder of said mixture being a second component of protective colloid being an aminoethyl-hydroxypropyl cellulose having a molar substitution of from 0.05 to 1.5 mols of aminoethyl groups and from 3 to 4 mols of hydroxypropyl groups and a viscosity, measured in a 2% aqueous solution at 20° C. and a pH of 5, of from 50 to 500 mPas, as said at least two protective colloids, whereby said polyvinyl chloride has a low tendency to form specks and a high plasticizer absorption capacity.

2. In the process for the production of polyvinyl chloride comprising the steps of heating an aqueous suspension of monomers selected from the group consisting of vinyl chloride and mixtures of vinyl chloride with up to 20% by weight of monomers copolymerizable with vinyl chloride under suspension polymerization conditions in the presence of from 0.01% to 3.0% by weight, based on the weight of monomers, of at least one monomer-soluble free-radical polymerization catalyst, and from 0.05% to 0.5% by weight, based on the weight of the monomers, of at least two protective colloids, at a pH of from 3 to 8 and the autogenous vinyl chloride pressure, to a temperature of from 30° C. to 70° C. for a time sufficient to effect polymerization and recovering said polyvinyl chloride having a K-value of from 40 to 80, the improvement consisting of utilizing a mixture of a first component of from 20% to 80% of the weight of said mixture of a polyvinyl acetate having a hydrolysis degree of 40 to 50 mol % and a viscosity, measured in a 4% solution of a 1:1 mixture of isopropanol and water at 20° C. by the Höppler falling-ball viscosimeter, of from 5 to 15 mPas, and the remainder of said mixture being a second component of protective colloid being a vinyl acetate/vinyl pyrrolidone copolymer containing from 50% to 70% by weight of vinyl pyrrolidone and 30% to 50% by weight of vinyl acetate and having a K-value of from 25 to 40, as said at least two protective colloids, whereby said polyvinyl chloride has a low tendency to form specks and a high plasticizer absorption capacity.

* * * * *